Aug. 4, 1931.   D. B. GENTRY   1,817,813
DEMOUNTABLE RIM
Filed June 5, 1930

INVENTOR.
Douglas B. Gentry,
BY Geo. P. Kimmel
ATTORNEY.

Patented Aug. 4, 1931

1,817,813

UNITED STATES PATENT OFFICE

DOUGLAS B. GENTRY, OF CROZET, VIRGINIA

DEMOUNTABLE RIM

Application filed June 5, 1930. Serial No. 459,273.

This invention relates to a demountable, sectional rim for use in connection with disc and wire wheels, and has for its object to provide, in a manner as hereinafter set forth, a rim of the class referred to capable of having the sections thereof quickly disconnected from each other to permit of the expeditious removal and replacing of a tire when occasion so requires.

A further object of the invention is to provide, in a manner as hereinafter set forth, a demountable, sectional rim capable of being quickly secured upon the felloe of a wheel for coupling a tire in position.

Further objects of the invention are to provide, in a manner as hereinafter set forth, a demountable, sectional rim which is simple in its construction and arrangement, strong, durable, compact, thoroughly efficient in its use, conveniently adjusted to enable the expeditious positioning or removing a tire upon or from a wheel felloe, readily assembled, and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1:
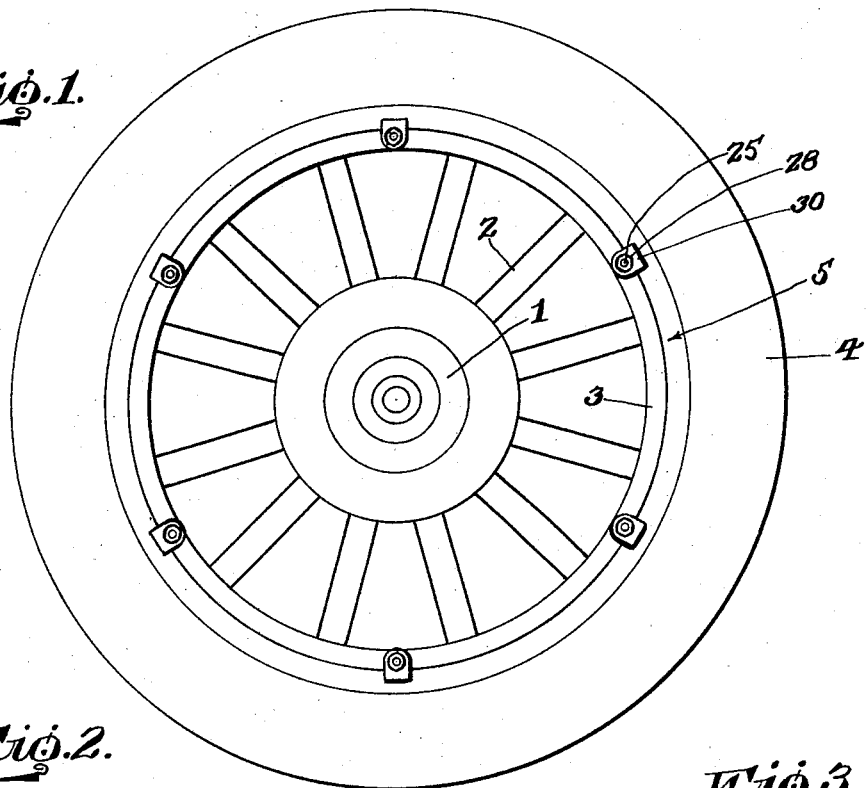
Figure 1 is a side elevation of a wheel provided with a pneumatic tire and showing the adaptation with the tire and wheel of a demountable, sectional rim in accordance with this invention.

Referring to the drawings in detail, 1 denotes the hub, 2 the spokes, 3 the felloe and 4 the tire of a wheel. Interposed between the felloe 3 and the tire 4 is a rim 5 in accordance with this invention.

The rim 5 includes a pair of circular like parts of channel shape in transverse cross section and referred to generally at 6, 7. The parts 6, 7 are spaced from each other and the open ends of the channels provided by said parts oppose each other. The parts 6, 7 have their radially inwardly facing surfaces seated on the radially outwardly facing surface of the felloe 3.

Figure 2:
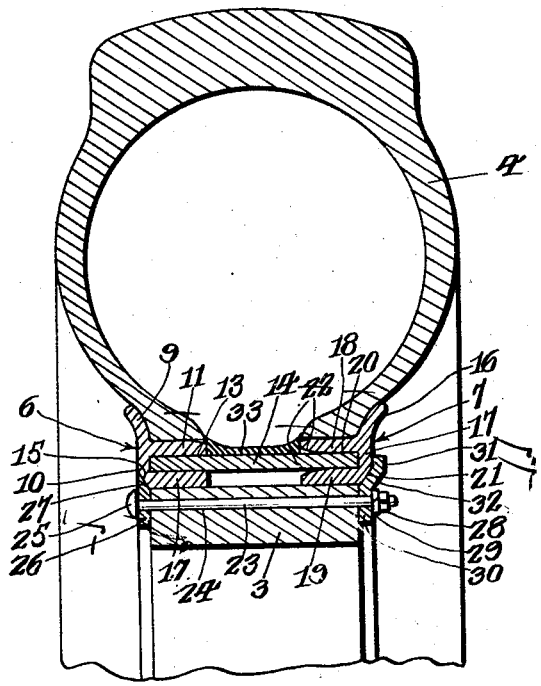
Figure 2 is a cross section of a wheel illustrating the arrangement of a demountable sectional rim in accordance with this invention with respect to the felloe of the wheel.
Figure 3:
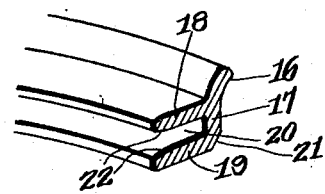
Figure 3 is a fragmentary view in perspective of the removable rim section.

A demountable, sectional rim, in accordance with this invention as shown in Figures 1, 2 and 3 is of the flanged type. The part 6 includes an outer side portion 10, a front portion 11 and a rear portion 12. The portions 11, 12 are concentrically arranged relative to and spaced from each other and integral with the portion 12. The portions 10, 11 and 12 are arranged to form a channel 13 and in transverse cross sections the portions 11, 12 extend inwardly at right angles to portion 10. The portion 10 is the base, the portion 11 the front or outer wall and the portion 12 the rear or inner wall of the channel 13. Formed integral with the base of the channel 13 is a flange 9.

Extending into the channel 13 is a side portion of an annulus 14 having its length in transverse cross section corresponding with the transverse cross sectional length of felloe 3. The annulus 14 is welded to part 6.

The length of the part 6 in transverse cross section is less than the length of annulus 14 in transverse cross section.

The part 6 is beveled at the radial inward portion of the base of channel 13, as at 15.

The part 7 includes an outer side portion 17, a front portion 18 and a rear portion 19. The portions 18, 19 are concentrically arranged relative to and spaced from each other and are integral with the portion 17. In transverse cross section the parts 18, 19 extend inwardly at right angles to the portion 17. The portions 17, 18 and 19 are arranged to form a channel 20. The portion 17 is the base, the portion 18 the front or outer wall and the portion 19 the rear or inner wall of channel 20. Formed integral with the base of the channel 20 is a flange 16.

Extending into the channel 20 is the outer side part of annulus 14. The annulus 20 is not secured to part 7, and the length of the latter in transverse cross section is less than the length of annulus 14 in transverse cross section. The opposed faces of the parts 18, 19 are beveled, as at 22 to facilitate the positioning of part 7 upon the annulus 14.

The part 7 is beveled at the radial inward portion of the base of channel 20, as at 21.

When the parts 6, 7 are seated upon the felloe 3, the portions 10 and 17 of said parts project beyond the sides of felloe 3.

The tire 4 is seated upon the parts 11, 18 and bears against the flanges 9, 16. The parts 12 and 19 maintain the annulus 14 in spaced relation with respect to the felloe 3.

A set of clamping devices is employed for securing the rim upon the felloe 3. The number of clamping devices of the set can be as desired and by way of example the set consists of six. As the clamping devices are of like construction, but one will be described as the description of one will apply to the other. Each clamping device includes a headed bolt 23 extending through a transverse opening 24 formed in the felloe 3. The shank of each bolt is of a length greater than the cross sectional length of the body of the felloe 3. The head of the bolt 23 is indicated at 25. Interposed between the head 25 and the felloe 3 is a clamping lug 26 having a bevelled end 27 which seats against the bevelled portion 15 of the outer side part 10 of section 6. Carried by the bolt 23 is a nut 28 and a locking washer 29. Interposed between the locking washer 29 and the felloe 3 is a clamping member formed of an inner part 30, an outer part 31, and an intermediate part 32. The part 30 abuts against the felloe 3. The intermediate part 32 is outwardly inclined and abuts against the inclined portion 21 at the outer side part of section 7. The part 31 abuts against the outer face of the outer side part 17 of section 7. The clamping lug 26 and clamping member 29 are mounted on the bolt 23 and are maintained in clamping engagement with the sections 6, 7 respectively, by the head 25, nut 28 and washer 29. The arrangement of each clamping device is such that when the nut 28 is loosened or removed or rather removed from the bolt 23, the washer 29 can also be removed and as well as the clamping member, after which the section 7 can be slipped off of the annulus 14 and the tire expeditiously moved.

Interposed between the parts 11 and 18 and seating upon the annulus 14 is a rubber annulus 33. The annulus 33 is employed to form a cushion for and to prevent the inner tube from corroding. The inner tube is not shown.

Figure 4:
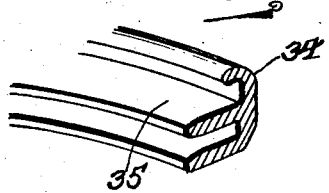
Figure 4 is a like view of a modified form.

With respect to the modified form shown in Figure 4 it relates to what is termed a clincher type rim and the annular member of U-shaped section, of either the section 6 or section 7 has extending therefrom a clincher 34. The annular member of U-shaped cross section is indicated at 35.

The rim with reference to Figure 4 would be constructed in the same manner as that shown in Figure 2, with this exception that the clincher 34 would be employed in connection with each section. The rim has a drop center effect and if necessary can change tires without taking off the rim.

What I claim is:—

A demountable sectional tire retaining rim formed of a pair of oppositely disposed, circular, spaced opposed like parts of channel shaped contour in transverse cross section adapted to encompass and having their radially inwardly facing surfaces directly seating against a felly of a wheel and with the open ends of the channels provided by said parts facing each other, said parts projecting laterally beyond the sides of a felly, each of said parts having a tire retaining flange on the channel base and being beveled at the radial inwardly portion of the latter to provide for the abutting and overlapping of the bases of the channels by clamping means carried by the felly to retain the rim in position, and an annulus having one side extending into and permanently secured in one of said channels and its other side extending into and detachably engaging in the other of said channels, said annulus of a width corresponding to the width of that of the felly and permanently spaced from the latter by said parts.

In testimony whereof, I affix my signature hereto.

DOUGLAS B. $\overset{his}{\times}$ GENTRY.
mark